United States Patent
Asao et al.

(10) Patent No.: US 12,258,902 B2
(45) Date of Patent: Mar. 25, 2025

(54) GAS TURBINE COGENERATION SYSTEM, METHOD OF OPERATING GAS TURBINE COGENERATION SYSTEM, AND METHOD OF MODIFYING GAS TURBINE COGENERATION SYSTEM

(71) Applicant: MITSUBISHI HEAVY INDUSTRIES, LTD., Tokyo (JP)

(72) Inventors: Takashi Asao, Tokyo (JP); Kazuhiko Sato, Tokyo (JP); Shohei Yoshida, Tokyo (JP); Ryo Akiyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 4 days.

(21) Appl. No.: 18/510,997

(22) Filed: Nov. 16, 2023

(65) Prior Publication Data
US 2024/0175395 A1 May 30, 2024

(30) Foreign Application Priority Data
Nov. 29, 2022 (JP) .................. 2022-189714

(51) Int. Cl.
| | |
|---|---|
| *F02C 6/18* | (2006.01) |
| *F02C 3/22* | (2006.01) |
| *F02C 3/30* | (2006.01) |
| *F02C 9/28* | (2006.01) |

(52) U.S. Cl.
CPC .................. *F02C 6/18* (2013.01); *F02C 3/22* (2013.01); *F02C 3/30* (2013.01); *F02C 9/28* (2013.01); *F05D 2240/35* (2013.01)

(58) Field of Classification Search
CPC ....................................... F02C 3/30
See application file for complete search history.

(56) References Cited

U.S. PATENT DOCUMENTS

| | | | |
|---|---|---|---|
| 2014/0260314 A1* | 9/2014 | Koganezawa | F02C 9/40 60/787 |
| 2020/0018231 A1* | 1/2020 | Ito | F02C 9/28 |

FOREIGN PATENT DOCUMENTS

| | | |
|---|---|---|
| JP | 2010-19195 | 1/2010 |
| JP | 2021060012 A * | 4/2021 |
| JP | 2022-67465 | 5/2022 |

OTHER PUBLICATIONS

English translation of JP2021060012A (Year: 2021).*

* cited by examiner

*Primary Examiner* — Scott J Walthour
(74) *Attorney, Agent, or Firm* — Wenderoth, Lind & Ponack, L.L.P.

(57) ABSTRACT

A gas turbine cogeneration system includes: a gas turbine; a first fuel supply facility for supplying a first fuel to the combustor; a second fuel supply facility for supplying a second fuel with a calorific value per mass lower than the first fuel; a heat recovery steam generator for generating steam using exhaust gas discharged from the turbine; a steam supply line for supplying steam discharged from the heat recovery steam generator to a steam consumer; a steam extraction line for supplying steam extracted from the steam supply line to both a head end side of the combustor and a turbine side of the combustor; and a fuel control part for controlling the first and second fuel supply facilities so that the amount of the first fuel decreases and the amount of the second fuel increases with a decrease in extraction amount of steam by the steam extraction line.

9 Claims, 9 Drawing Sheets

GAS TURBINE COGENERATION SYSTEM, METHOD OF OPERATING GAS TURBINE COGENERATION SYSTEM, AND METHOD OF MODIFYING GAS TURBINE COGENERATION SYSTEM

TECHNICAL FIELD

The present disclosure relates to a gas turbine cogeneration system which supplies steam generated by a heat recovery steam generator to a steam consumer and a gas turbine.

The present application claims priority based on Japanese Patent Application No. 2022-189714 filed on Nov. 29, 2022, the entire content of which is incorporated herein by reference.

BACKGROUND ART

In a gas turbine system disclosed in Patent Document 1, a mixed gas containing ammonia gas and steam and a fuel such as natural gas are supplied to a combustor of a gas turbine. The ammonia gas is produced from a treated liquid using exhaust gas, which is a drive medium fluid for a turbine, discharged from a heat recovery steam generator of the gas turbine system as a heat source. Steam generated by the heat recovery steam generator is supplied to a steam utilizing facility which is a steam consumer.

CITATION LIST

Patent Literature

Patent Document 1: JP2022-067465A

SUMMARY

In the gas turbine system described above, steam generated by the heat recovery steam generator could be partially supplied to the inlet side of the turbine for the purpose of improving the output of the gas turbine. However, when the amount of steam supplied to the steam consumer is increased, the amount of steam supplied to the turbine decreases, resulting in a decrease in the output of the gas turbine. One way to compensate for this decrease is to rise the temperature of a drive medium fluid by increasing the supply of fuel. However, there is a limit to the temperature of hot parts such as combustors and turbine blades in terms of their high-temperature strength/durability, as well as the rising temperature of the drive medium fluid increases NOx emissions. Therefore, there is a limit to increasing the supply of fuel.

An object of the present disclosure is to provide a gas turbine cogeneration system, a method of operating a gas turbine cogeneration system, and a method of modifying a gas turbine cogeneration system whereby it is possible to maintain the output of a gas turbine even when the amount of steam supplied to a steam consumer is increased.

A gas turbine cogeneration system according to at least one embodiment of the present disclosure includes: a gas turbine including a compressor, a combustor, and a turbine: a first fuel supply facility for supplying a first fuel to the combustor: a second fuel supply facility for supplying a second fuel with a calorific value per mass lower than the first fuel: a heat recovery steam generator for generating steam using exhaust gas discharged from the turbine; a steam supply line for supplying the steam discharged from the heat recovery steam generator to a steam consumer: a steam extraction line for supplying the steam extracted from the steam supply line to both a head end side of the combustor and a turbine side of the combustor that is closer to the turbine than the head end; and a fuel control part for controlling the first fuel supply facility and the second fuel supply facility so that the supply amount of the first fuel decreases and the supply amount of the second fuel increases with a decrease in extraction amount of the steam by the steam extraction line.

At least one embodiment of the present disclosure provides a method of operating a gas turbine cogeneration system including: a gas turbine including a compressor, a combustor, and a turbine: a first fuel supply facility for supplying a first fuel to the combustor: a second fuel supply facility for supplying a second fuel with a calorific value per mass lower than the first fuel: a heat recovery steam generator for generating steam using exhaust gas discharged from the turbine: a steam supply line for supplying the steam discharged from the heat recovery steam generator to a steam consumer; and a steam extraction line for supplying the steam extracted from the steam supply line to both a head end side of the combustor and a turbine side of the combustor that is closer to the turbine than the head end. The method includes a fuel control step of controlling the first fuel supply facility and the second fuel supply facility so that the supply amount of the first fuel decreases and the supply amount of the second fuel increases with a decrease in extraction amount of the steam by the steam extraction line.

At least one embodiment of the present disclosure provides a method of modifying a gas turbine cogeneration system including: a gas turbine including a compressor, a combustor, and a turbine: a first fuel supply facility for supplying a first fuel to the combustor: a heat recovery steam generator for generating steam using exhaust gas discharged from the turbine; a steam supply line for supplying the steam discharged from the heat recovery steam generator to a steam consumer; and a steam extraction line for supplying the steam extracted from the steam supply line to both a head end side of the combustor and a turbine side of the combustor that is closer to the turbine than the head end. The method includes: a combustor replacement step of replacing the combustor configured to burn only the first fuel with a combustor configured to burn both the first fuel and a second fuel with a calorific value per mass lower than the first fuel: a fuel supply facility addition step of adding a second fuel supply facility for supplying the second fuel; and a controller change step of changing a controller for controlling the first fuel supply facility so that only the first fuel is supplied as fuel to a controller for controlling the first fuel supply facility and the second fuel supply facility so that the supply amount of the first fuel decreases and the supply amount of the second fuel increases with a decrease in extraction amount of the steam by the steam extraction line.

The present disclosure provides a gas turbine cogeneration system, a method of operating a gas turbine cogeneration system, and a method of modifying a gas turbine cogeneration system whereby it is possible to maintain the output of a gas turbine even when the amount of steam supplied to a steam consumer is increased.

DETAILED DESCRIPTION

Figure 1:
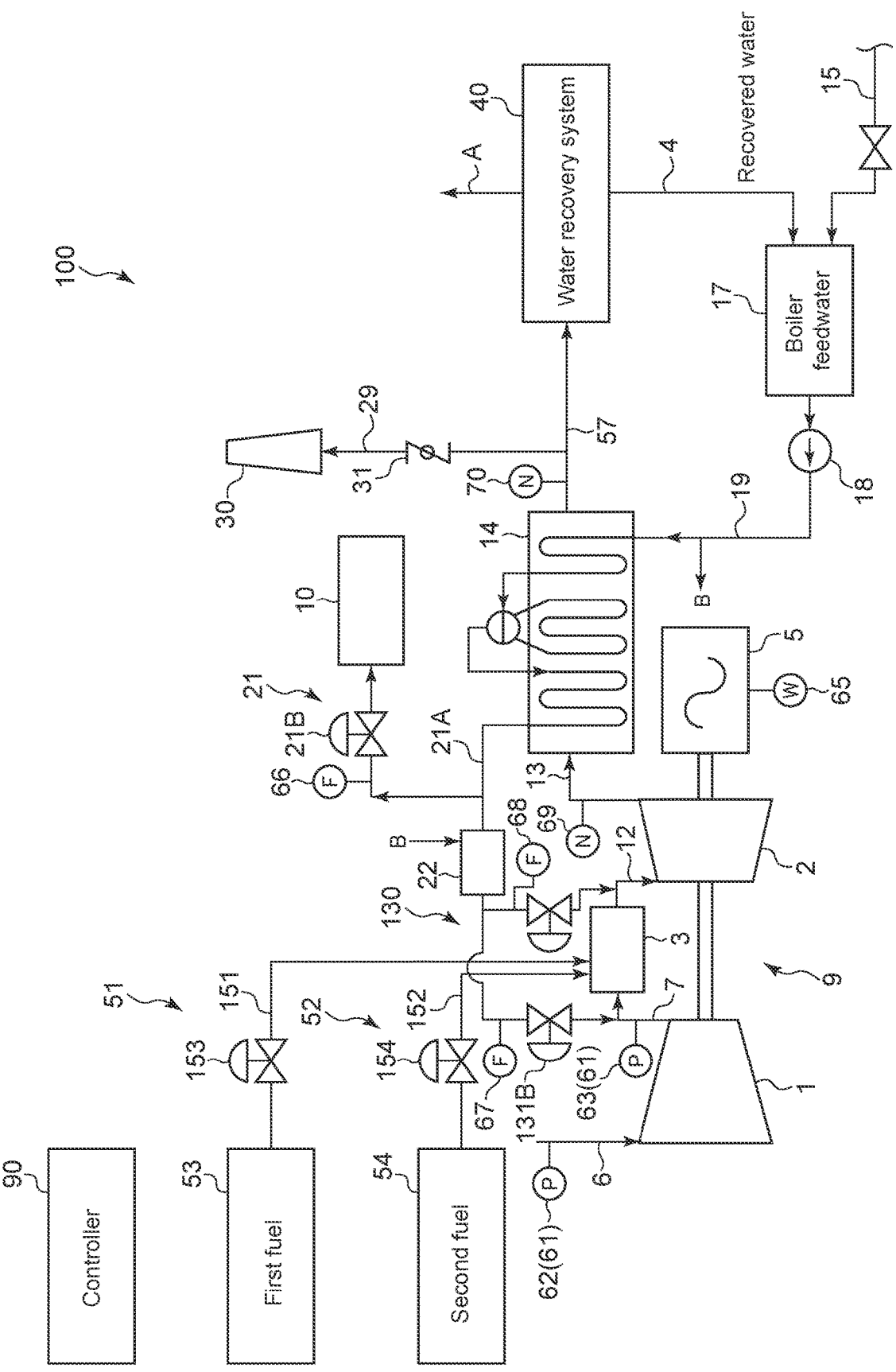
FIG. 1 is a schematic diagram of a gas turbine cogeneration system according to an embodiment.

Embodiments of the present disclosure will be described below with reference to the accompanying drawings. It is intended, however, that unless particularly identified, dimensions, materials, shapes, relative positions, and the like of components described in the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The same features can be indicated by the same reference numerals and not described in detail.

<Overview of Gas Turbine Cogeneration System 100>

FIG. 1 is a schematic diagram of a gas turbine cogeneration system 100 (hereinafter, also referred to as cogeneration system 100) according to an embodiment of the present disclosure. The cogeneration system 100, which may be for example a power plant, includes a gas turbine 9 and a heat recovery steam generator 14. The gas turbine 9 includes a compressor 1 for generating compressed air 7 from atmospheric air 6, a combustor 3 for burning fuel with oxygen in the compressed air 7 as an oxidant and raising the temperature of the compressed air 7 to generate combustion gas 12, a turbine 2 which rotates with the combustion gas 12 discharged from the combustor 3 as a driving source, and a generator 5 connected to the turbine 2. The fuel supplied to the combustor 3 includes a first fuel and a second fuel (details will be described later). The heat recovery steam generator 14 is configured to generate steam from boiler feedwater using heat recovered from exhaust gas 13 discharged from the turbine 2. The boiler feedwater is water to be supplied to the heat recovery steam generator 14.

The cogeneration system 100 includes a steam supply line 21 for supplying steam discharged from the heat recovery steam generator 14 to a steam consumer 10. The steam supply line 21 includes a steam pipe 21A connected to the heat recovery steam generator 14 and the steam consumer 10, and a steam flow control valve 21B disposed in the steam pipe 21A. By controlling the opening degree of the steam flow control valve 21B with a controller 90 described below, the consumer steam supply amount, which is the amount of steam supplied to the steam consumer 10, is controlled. The steam consumer 10 may be, for example, a steam turbine. The steam consumer 10 may be a steam turbine of a combined cycle power plant or an industrial process unit. The cogeneration system 100 further includes a steam extraction line 130 for supplying steam extracted from the steam supply line 21 to the combustor 3. The configuration of the steam extraction line 130 will be described in detail later.

Although not essential components of the present disclosure, the cogeneration system 100 may include a water recovery system 40 for recovering water contained in the exhaust gas 13 discharged from the heat recovery steam generator 14, a feedwater tank 17 for storing recovered water including water recovered from the water recovery system 40 as boiler feedwater, a feedwater line 15 for supplying the boiler feedwater to the feedwater tank 17, a feedwater line 19 connected to the feedwater tank 17 and the heat recovery steam generator 14, and a feedwater pump 18 disposed in the feedwater line 19. When the feedwater pump 18 is driven, the boiler feedwater stored in the feedwater tank 17 is supplied to the heat recovery steam generator 14 through the feedwater line 19. Higher temperature of boiler feedwater supplied to the heat recovery steam generator 14 is preferred. This is because the heat required by the heat recovery steam generator 14 to generate steam is reduced, and the efficiency of the cogeneration system 100 is improved.

Although not essential components of the present disclosure, the cogeneration system 100 may include an exhaust gas supply line 57 which is a supply line for the exhaust gas 13 from the heat recovery steam generator 14 to the water recovery system 40, an exhaust line 29 diverging from the exhaust gas supply line 57, and an exhaust damper 31 disposed in the exhaust line 29. The exhaust gas 13 flowing through the exhaust line 29 is exhausted to the outside through an exhaust tower 30. In an embodiment of the present disclosure, when the exhaust gas 13 is supplied from the cogeneration system 100 to the water recovery system 40, the exhaust damper 31 is closed and the exhaust gas 13 does not flow into the exhaust line 29.

<Schematic Configuration of Combustor 3>

Figure 2:
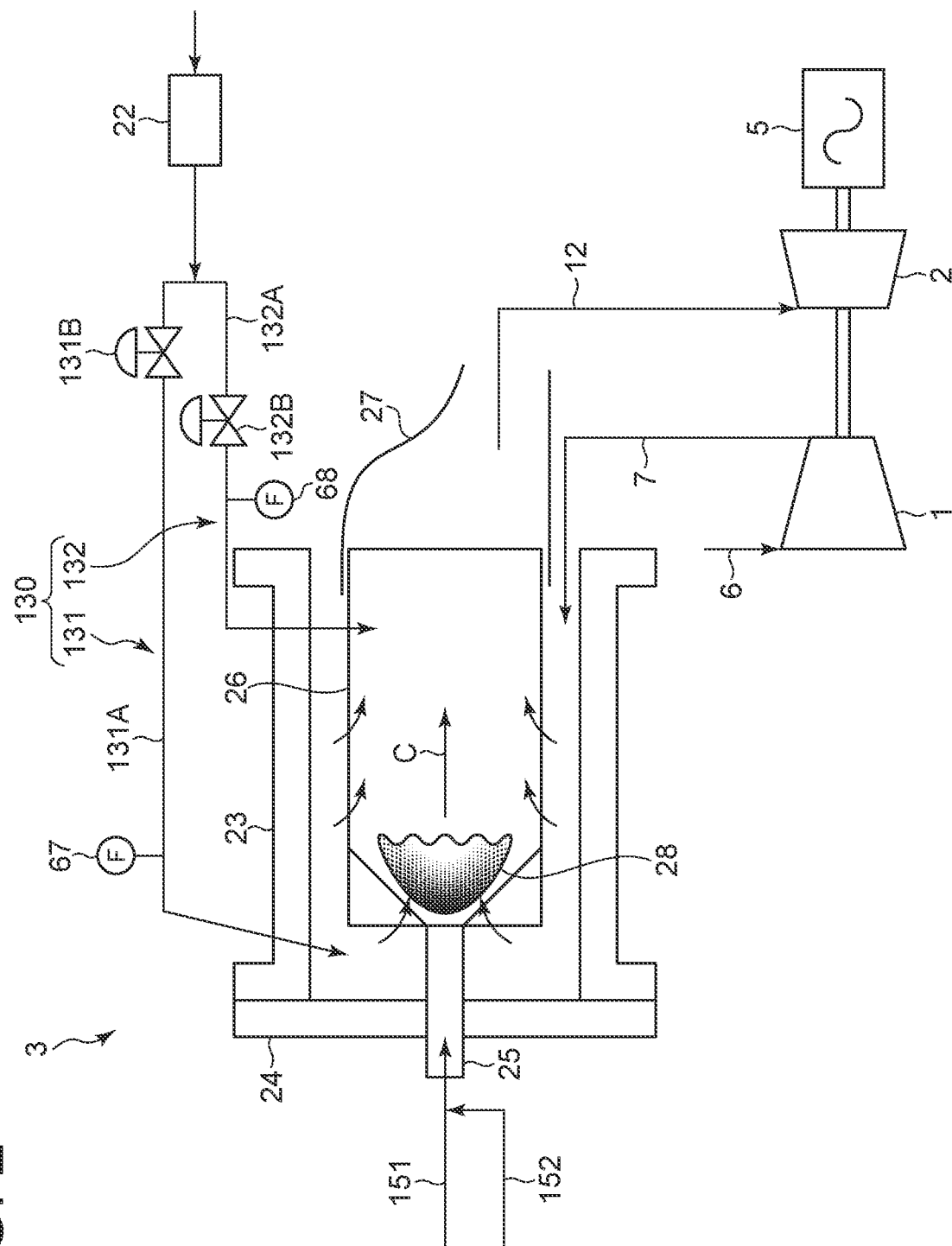
FIG. 2 is a schematic diagram of a combustor according to an embodiment.

FIG. 2 is a schematic diagram of the combustor 3 according to an embodiment of the present disclosure. The combustor 3 includes a cylindrical combustor casing 23, a head end 24 disposed at one end of the combustor casing 23, a fuel nozzle 25 disposed in the head end 24, a cylindrical combustion liner 26 which separates unburned air from burnt combustion gas 12, and a combustor transition piece 27 connected to the downstream side of the combustion liner 26. The compressed air 7 is supplied to the combustor casing 23. In the combustor casing 23, the compressed air 7 flows through an annular space formed outside the combustion liner 26 toward the head end 24. The compressed air 7 flowing through the annular space flows into the combustion liner 26 and mixes with fuel injected into the combustion liner 26 from the fuel nozzle 25. The fuel burns inside the combustion liner 26 to generate a flame 28 inside the combustion liner 26. The combustion gas 12 generated inside the combustion liner 26 is discharged from the combustor transition piece 27 and flows into the turbine 2.

<Fuel Supply System of Combustor 3>

Referring to FIG. 1 again, the fuel supplied to the combustor 3 includes the first fuel and the second fuel. The cogeneration system 100 includes a first fuel supply facility 51 for supplying the first fuel to the combustor 3 and a second fuel supply facility 52 for supplying the second fuel to the combustor 3. The first fuel supply facility 51 includes a first supply source 53 which is a supply source of the first fuel, a first pipe 151 for directing the first fuel from the first supply source 53 to the fuel nozzle 25 (see FIG. 2) of the combustor 3, and a first fuel flow control valve 153 disposed in the first pipe 151. Similarly, the second fuel supply facility 52 includes a second supply source 54 which is a supply source of the second fuel, a second pipe 152 for directing the second fuel from the second supply source 54 to the fuel nozzle 25, and a second fuel flow control valve 154 disposed in the second pipe 152. By controlling the opening degree of the first fuel flow control valve 153 and the opening degree of the second fuel flow control valve 154 with a controller 90 described below; the first fuel supply amount, which is the supply amount of the first fuel, and the second fuel supply amount, which is the supply amount of the second fuel, are adjusted. In other words, the controller 90 can adjust the second fuel co-firing ratio in the combustor 3. The second fuel co-firing ratio is the proportion of the second fuel in the fuel supplied to the combustor 3. This proportion is a value calculated on a calorific value or weight basis.

The second fuel has a calorific value per mass lower than the first fuel. The first fuel is fuel gas with high calorific value, e.g., any of natural gas, off gas, or hydrogen gas fuel mainly composed of hydrogen gas. The second fuel is fuel gas with medium calorific value, a high hydrogen compound with a calorific value of about 40% of the first fuel, e.g., fuel mainly composed of ammonia or methanol. More preferably, the first fuel is natural gas or off gas, and the second fuel is fuel mainly composed of ammonia gas. In this case, the second fuel co-firing ratio is the so-called ammonia co-firing ratio.

In order to solve the aforementioned problems, it is possible to use an ammonia gas-fired gas turbine or to convert a gas turbine that is used to burn only the first fuel to an ammonia gas-fired gas turbine as an option to solve the problems. At this time, however, it is advantageous to address the problems with embodiments of the present disclosure in terms of fuel cost.

Figure 3:
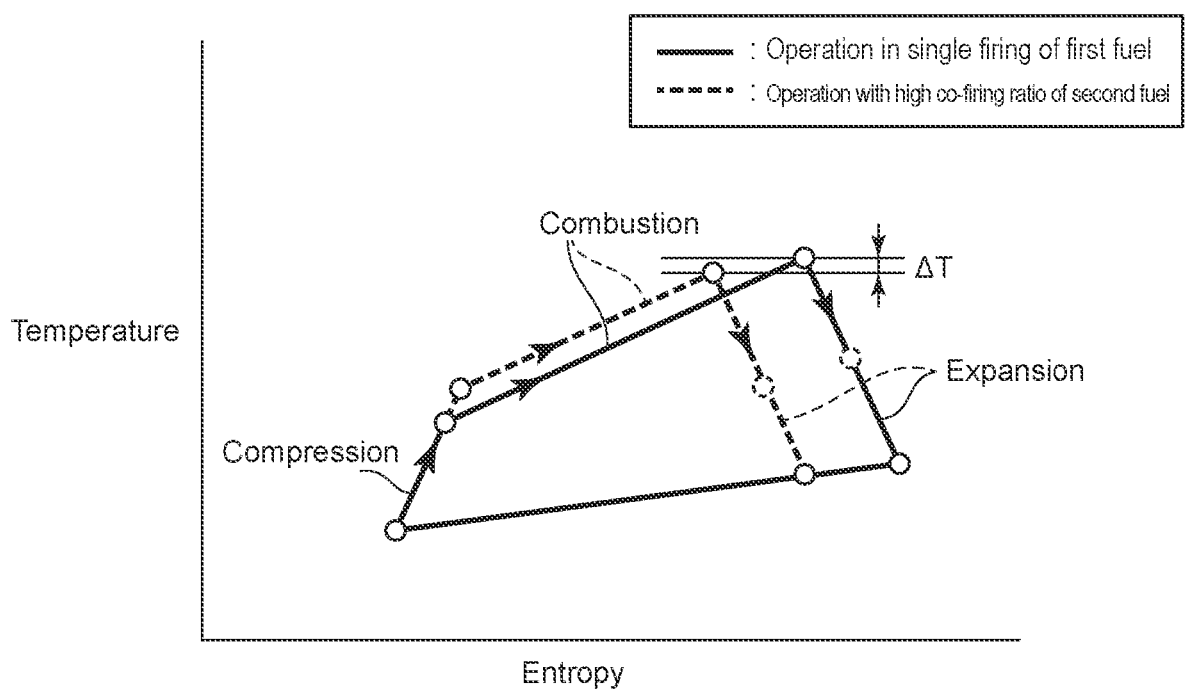
FIG. 3 is a T-S diagram of a gas turbine according to an embodiment.

FIG. 3 is a T-S diagram of the gas turbine 9 according to an embodiment of the present disclosure. In the graph of this figure, the solid line indicates the operation cycle diagram for single-firing of the first fuel, and the dashed line indicates the cycle diagram for operation with high co-firing ratio of the second fuel. There is some overlap between the cycles indicated by the solid line and the dashed line. As shown in the figure, it is understood that the operating efficiency of the gas turbine 9 improves when the second fuel co-firing ratio increases, because the area of the cycle diagram is smaller.

When the second fuel is fuel that produces more water as a result of combustion than the first fuel, such as ammonia, the temperature of the combustion gas 12 drops significantly due to the latent heat of evaporation of water produced by combustion, thereby suppressing the increase in the inlet temperature of the turbine 2. AT in FIG. 3 indicates the amount of decrease in the inlet temperature of the turbine 2 (turbine inlet temperature). From this, it is understood that the allowable upper limit supply amount of the second fuel supply amount is higher than the allowable upper limit supply amount of the first fuel supply amount. The allowable upper limit supply amount is the supply amount of fuel to avoid the gas turbine inlet temperature exceeding the heat resistance temperature of the turbine 2. Since the second fuel is a hydrogen compound (high hydrogen compound) whose calorific value is about 40% of that of the first fuel, to achieve the combustor energy input equivalent to the first fuel with the second fuel, a mass flow rate of 2.5 times that of the first fuel is required during single-firing of the second fuel, and the amount of water produced by combustion increases in response to this change in mass flow rate.

<Configuration of Steam Extraction Line 130>

The steam extraction line 130 shown in FIGS. 1 and 2 is configured to supply steam extracted from the steam supply line 21 to both the head end 24 side of the combustor 3 and the turbine 2 side of the combustor 3. The head end 24 side of the combustor 3 refers to the upstream side in the combustion gas flow direction from the region of the combustor casing 23 where the flame 28 is formed. The combustion gas flow direction indicates the direction in which the combustion gas 12 flows in the combustion liner 26, and is illustrated by arrow C. Further, the turbine 2 side of the combustor 3 refers to the downstream side in the combustion gas flow direction from the region of the combustor casing 23 where the flame 28 is formed.

As shown in FIG. 2, the steam extraction line 130 includes an upstream steam line 131 for supplying steam extracted from the steam pipe 21A of the steam supply line 21 to the head end 24 side of the combustor 3, and a downstream steam line 132 for supplying the extracted steam to the turbine 2 side of the combustor 3.

The upstream steam line 131 includes an upstream steam pipe 131A for supplying the extracted steam between the head end 24 and the combustion liner 26, and an upstream steam flow control valve 131B disposed in the upstream steam pipe 131A. By controlling the opening degree of the upstream steam flow control valve 131B with a controller 90 described below; the upstream steam supply amount, which is the amount of steam introduced to the combustor 3 through the upstream steam pipe 131A, is adjusted. As the upstream steam supply amount increases, the effect of lowering the temperature of the flame zone increases, so that the amount of nitrogen oxides generated in the combustor 3 decreases.

The downstream steam line 132 includes a downstream steam pipe 132A for supplying the extracted steam to the downstream side of the combustion liner 26, and a downstream steam flow control valve 132B disposed in the downstream steam pipe 132A. By controlling the opening degree of the downstream steam flow control valve 132B with a controller 90 described below; the downstream steam supply amount, which is the amount of steam introduced to the combustor 3 through the downstream steam pipe 132A, is adjusted. As the total steam supply amount, i.e., the sum of the upstream and downstream steam supply to the combustor, increases, the flow rate of steam that flows into the turbine 2 to do work increases, and the output of the gas turbine 9, i.e., the power generation amount of the generator 5 increases. Conversely, as the total steam supply amount decreases, the output of the gas turbine 9 decreases as long as the fuel supply conditions in the combustor 3 remain the same.

Referring to FIG. 1 again, although not essential components of the present disclosure, the steam extraction line 130 may further include a desuperheater 22 for lowering the temperature of steam extracted from the steam supply line 21. The desuperheater 22, disposed upstream of the upstream steam pipe 131A and the downstream steam pipe 132A in the steam flow direction, is configured such that, for example, part of boiler feedwater to be supplied to the heat recovery steam generator 14 flows in as cold water (see arrow B), and the cold water injected into the desuperheater 22 cools the steam. The cooled steam flows through the upstream steam pipe 131A and the downstream steam pipe 132A.

<Measuring Tool of Cogeneration System 100>

The cogeneration system 100 illustrated in FIG. 1 includes a generator output measuring tool 65 for measuring the amount of power generated by the generator 5, a compressor inlet air pressure measuring tool 62 for measuring the air pressure at the inlet of the compressor 1, a compressor outlet air pressure measuring tool 63 for measuring the air pressure at the outlet of the compressor 1, a steam flow meter 66 for measuring the consumer steam supply amount, an upstream steam flow meter 67 for measuring the upstream steam supply amount, a downstream steam flow meter 68 for measuring the downstream steam supply amount, a turbine outlet NOx measuring tool 69 for measuring the amount of nitrogen oxides at the outlet of the turbine 2, and a heat recovery steam generator outlet NOx measuring tool 70 for measuring the amount of nitrogen oxides contained in the exhaust gas 13 discharged from the heat recovery steam generator 14. The measurement results of these measuring tools are all sent to a controller 90, which is a component of the cogeneration system 100 described later. Hereinafter, the compressor inlet air pressure measuring tool 62 and the compressor outlet air pressure measuring tool 63 may be collectively referred to as "air pressure measuring tool 61," and nitrogen oxides may be referred to as "NOx." The heat recovery steam generator outlet NOx measuring tool 70 and the turbine outlet NOx measuring tool 69 are configured to measure the concentration of NOx.

<Water Recovery System 40>

Figure 4:
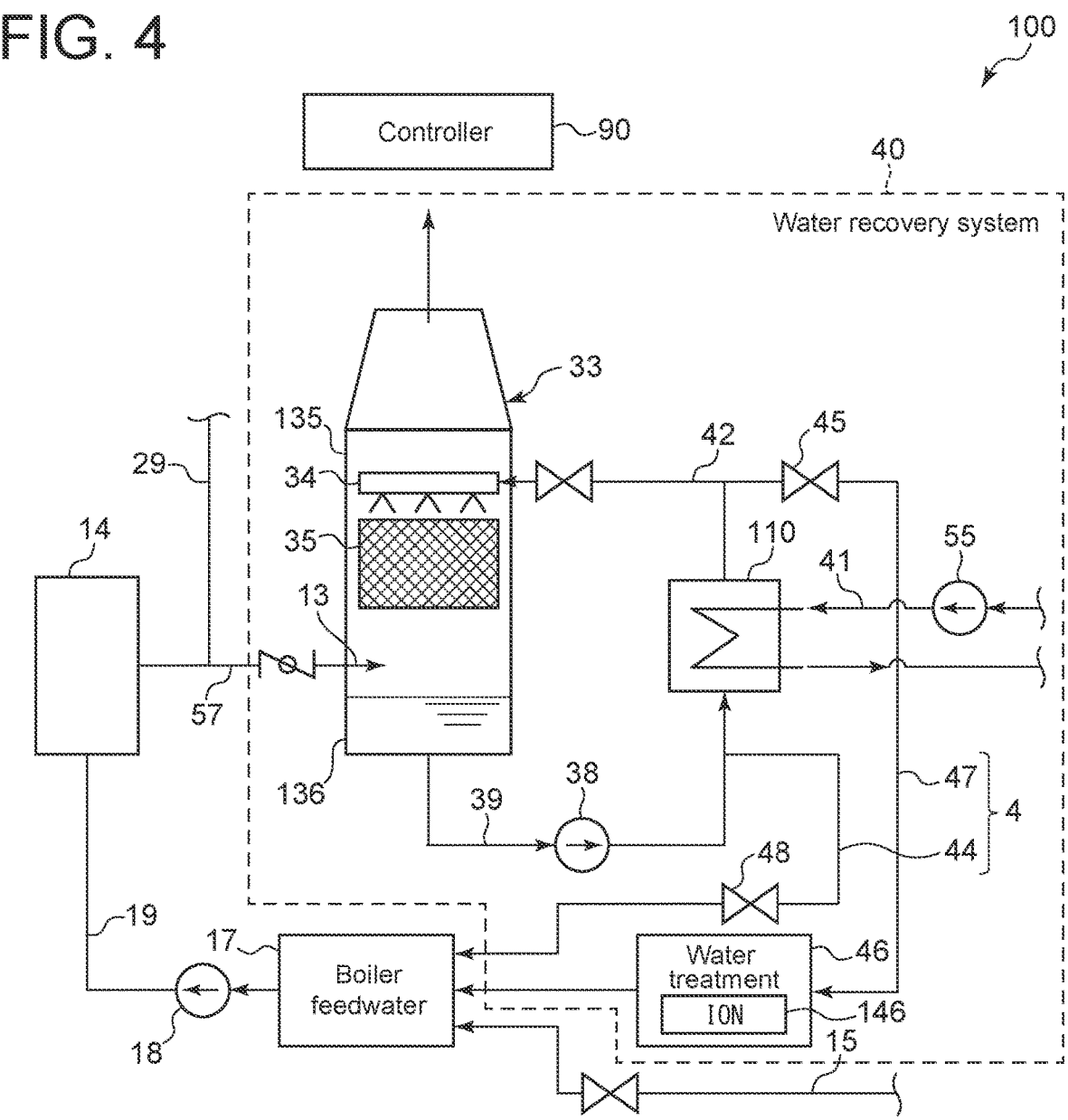
FIG. 4 is a schematic diagram of a water recovery system according to an embodiment.

FIG. 4 is a schematic diagram of the water recovery system 40 according to an embodiment of the present disclosure. The outline of the water recovery system 40 is as follows. A water recovery device 33, which is a component of the water recovery system 40, is configured to recover water in the exhaust gas 13 as recovered water by bringing the exhaust gas 13 introduced through the exhaust gas supply line 57 into gas-liquid contact with refrigerant water. As a more detailed example, the water recovery device 33 includes a heat exchange vessel 135 into which the exhaust gas 13 and refrigerant water flow, a spray device 34 for spraying refrigerant water inside the heat exchange vessel 135, and a packing material 35 disposed below the spray device 34 inside the heat exchange vessel 135. The exhaust gas 13 introduced through the exhaust gas supply line 57 flows into the heat exchange vessel 135. The refrigerant water sprayed by the spray device 34 adheres to the packing material 35 and exchanges heat with the exhaust gas 13 flowing into the heat exchange vessel 135. As a result, water in the exhaust gas 13 is condensed. Recovered water containing condensed water and refrigerant water that has undergone heat exchange falls and is stored in a water storage tank 136 that forms the lower part of the heat exchange vessel 135.

The water recovery system 40 includes a recovered water cooling device 110 for cooling recovered water discharged from the water storage tank 136 of the water recovery device 33, a recovered water discharge line 39 for directing recovered water discharged from the water storage tank 136 of the water recovery device 33 to the recovered water cooling device 110, and a recovered water supply line 42 for directing the cooled recovered water discharged from the recovered water cooling device 110 to the heat exchange vessel 135 as refrigerant water. The recovered water cooling device 110 of this example is configured to cool recovered water with cooling water, which may be seawater, for example. A cooling water supply line 41 for supplying cooling water to the recovered water cooling device 110 is provided with a cooling water supply pump 55.

The water recovery system 40 further includes a feedwater line 4 for directing recovered water to the feedwater tank 17. The feedwater line 4 includes a high temperature feedwater line 44 and a low temperature feedwater line 47. The high temperature feedwater line 44 is connected to the recovered water discharge line 39 and is configured to direct recovered water taken from the recovered water discharge line 39 to the feedwater tank 17. The recovered water taken from the recovered water discharge line 39 has heat recovered from the exhaust gas 13, and therefore has a relatively high temperature. The low temperature feedwater line 47 is connected to the recovered water supply line 42 and is configured to direct recovered water taken from the recovered water supply line 42 to the feedwater tank 17. The recovered water taken from the recovered water supply line 42 is cooled by the recovered water cooling device 110, and therefore has a relatively low temperature.

The low temperature feedwater line 47 is provided with a water treatment device 46, which is a component of the water recovery system 40. The water treatment device 46 is configured to apply a treatment to the recovered water flowing through the low temperature feedwater line 47 to remove impurities, such as sulfur, for example. Impurities are generated during combustion in the combustor 3 (see FIG. 1) and may be mixed in the exhaust gas 13. At least some of these impurities are dissolved in the recovered water by heat exchange between the exhaust gas 13 and refrigerant water in the water recovery device 33. The water treatment device 46 removes impurities from the recovered water, thereby reducing impurities in the boiler feedwater stored in the feedwater tank 17. In general, the lower the temperature of water to be treated, the higher the treatment capacity of the water treatment device 46 to remove impurities. If the temperature of the recovered water is higher, an ion exchange resin 146 that constitutes the water treatment device 46 may be damaged, and the treatment capacity of impurity removal may degrade.

The high temperature feedwater line 44 is provided with a high temperature feedwater open/close valve 48, and the low temperature feedwater line 47 is provided with a low temperature feedwater open/close valve 45, both of which are controlled by the controller 90 described above. For example, when the amount of the first fuel, which may be off gas, supplied to the combustor 3 is large (i.e., when the second fuel co-firing ratio is low), and the sulfur content in the exhaust gas 13 is higher than an allowable value and below an allowable upper limit, the controller 90 closes the high temperature feedwater open/close valve 48 and opens the low temperature feedwater open/close valve 45. As a result, low-temperature recovered water, which requires impurity removal treatment, flows into the feedwater tank 17 via the water treatment device 46 disposed in the low temperature feedwater line 47. Thus, impurities are prevented from adhering to devices constituting the cogeneration system 100, such as the feedwater line 19 and the heat recovery steam generator 14, and the degradation of the cogeneration system 100 can be suppressed. On the other hand, when the second fuel co-firing ratio is relatively large, i.e., the sulfur content in the exhaust gas 13 is not more than the allowable value, the controller 90 opens the high temperature feedwater open/close valve 48 and closes the low temperature feedwater open/close valve 45. As a result, high-temperature recovered water, which requires no impurity removal treatment, flows into the feedwater tank 17 via the high temperature feedwater line 44. Since the temperature of boiler feedwater supplied from the feedwater tank 17 to the heat recovery steam generator 14 can be increased, the efficiency of the cogeneration system 100 is improved. As described above, the water recovery system 40 in this example makes it possible to switch the supply line of recovered water sent to the feedwater tank 17 according to the second fuel co-firing ratio.

<Basic Configuration of Controller 90>

Figure 5:
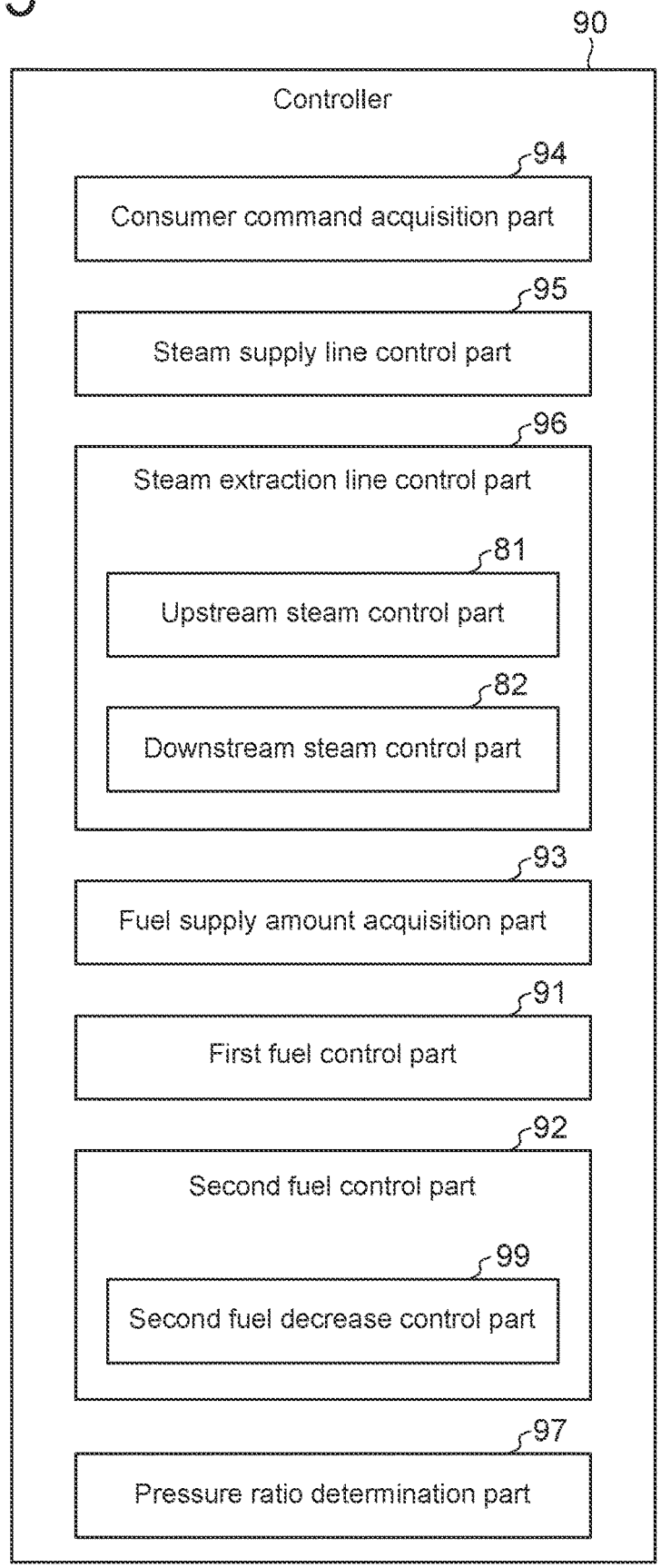
FIG. 5 is a schematic diagram of a controller according to an embodiment.

FIG. 5 is a schematic diagram of the controller 90 according to an embodiment of the present disclosure. The controller 90 comprises a computer, and includes a processor, a memory, and an external communication interface. The processor is, for example, CPU, GPU, MPU, DSP, or a combination of these. The processor according to another embodiment may be implemented by an integrated circuit of PLD, ASIC, FPGA, MCU, or the like. The memory is configured to temporarily or non-temporarily store various data, and is implemented by at least one of RAM, ROM, or flash memory. The processor executes various control processes in accordance with programs loaded in the memory. The controller 90 may be a DCS panel that constitutes one of multiple control panels that make up the cogeneration system 100.

The controller 90 with this hardware configuration performs control to increase the consumer steam supply amount for the purpose of improving the output of the steam consumer 10. Furthermore, at this time, the controller 90 also perform control to decrease the total steam supply amount, which is the sum of the upstream steam supply amount and the downstream steam supply amount to the combustor 3, and control to increase the second fuel co-firing ratio. In these controls, the controller 90 sends control signals to the steam flow control valve 21B, the upstream steam flow control valve 131B, the downstream steam flow control valve 132B, the first fuel flow control valve 153, and the second fuel flow control valve 154. The functional configuration of the controller 90 to perform such controls is as follows.

The controller 90 includes a consumer command acquisition part 94 for acquiring a consumer steam increase command to increase the consumer steam supply amount, a steam supply line control part 95 for controlling the steam supply line 21, a steam extraction line control part 96 for controlling the steam extraction line 130, and a fuel supply amount acquisition part 93 for acquiring the amount of fuel to be supplied to the combustor 3, based on an output command of the gas turbine 9.

The steam supply line control part 95 performs control to increase the opening degree of the steam flow control valve 21B of the steam supply line 21 so that the consumer steam supply amount indicated by the consumer steam increase command is achieved. With an increase in consumer steam supply amount, the amount of steam supplied to the gas turbine 9 must be reduced, and the steam extraction line control part 96 is configured to decrease the flow rate (supply amount) of steam introduced through the steam extraction line 130. The steam extraction line control part 96 in this example includes an upstream steam control part 81 for controlling the opening degree of the upstream steam flow control valve 131B, and a downstream steam control part 82 for controlling the opening degree of the downstream steam flow control valve 132B. Steam from the upstream steam flow control valve 131B is mainly intended to suppress NOx generation in the combustor 3, and the increased output of the gas turbine 9 is a secondary effect. On the other hand, the use of steam from the downstream steam flow control valve 132B is exclusively for increasing the output. In this embodiment, the opening degree of the steam flow control valve 21B is maintained for suppressing NOx generation, while the opening degree of the downstream steam flow control valve 132B is decreased. If the Fuel NOx value increases due to ammonia combustion, the opening degree of the upstream steam flow control valve 131B may be controlled as necessary to increase the opening degree of the upstream steam flow control valve 131B while reducing the total steam supply amount.

The output command of the gas turbine 9 acquired by the fuel supply amount acquisition part 93 will be described. In this example, the fuel supply amount acquisition part 93 acquires an output command such that the output of the gas turbine 9 is maintained even after the amount of steam extracted by the steam extraction line 130 decreases as the consumer steam supply amount increases. Such an output command is to increase the second fuel co-firing ratio by decreasing the supply amount of the first fuel and increasing the supply amount of the second fuel so that the energy input to the combustor is equivalent to that during single-firing of the first fuel. Since the calorific value per unit mass of the second fuel is lower (about 40%) than that of the first fuel, and the second fuel is a high hydrogen compound, the second fuel supply amount can be increased while avoiding the turbine inlet temperature exceeding the heat resistance temperature.

Further, the controller 90 includes a first fuel control part 91 and a second fuel control part 92 for controlling the first fuel supply facility 51 and the second fuel supply facility 52, respectively, so that the fuel supply obtained by the fuel supply amount acquisition part 93 is achieved. In an embodiment of the present disclosure, with a decrease in extraction amount of the steam by the steam extraction line 130, the first fuel control part 91 performs control to decrease the opening degree of the first fuel flow control valve 153, and the second fuel control part 92 performs control to increase the opening degree of the second fuel flow control valve 154.

To improve the output of the steam consumer 10 by increasing the consumer steam supply amount, it is necessary to decrease the extraction amount of the steam extraction line 130. With this configuration, in this case, the first fuel control part 91 decreases the supply amount of the first fuel, and the second fuel control part 92 increases the supply amount of the second fuel to maintain the output of the gas turbine 9. The second fuel must be supplied so that the turbine inlet temperature does not exceed a predetermined temperature, i.e., the heat resistance temperature of hot parts such as turbine blades disposed downstream of the turbine inlet, but the allowable upper limit supply amount of the second fuel is higher than that of the first fuel because of the lower calorific value per unit mass of the second fuel. In other words, since the supply of the second fuel is sufficient to maintain the output of the gas turbine 9, the consumer steam supply amount can be increased more than before. Thus, it is possible to achieve the cogeneration system 100 that can maintain the output of the gas turbine 9 even when the consumer steam supply amount is increased.

Additionally, according to the embodiment in which the first fuel is gaseous fuel such as natural gas or off gas, or hydrogen gas fuel mainly composed of hydrogen gas, carbon emissions can be reduced compared to the case where only the first fuel is burned or the first fuel is oil fuel such as heavy oil.

Additionally, according to the embodiment in which the second fuel is fuel mainly composed of ammonia or methanol, the increase in the combustor outlet temperature can be suppressed by the latent heat of evaporation of water produced by combustion of the second fuel. Even if the first fuel supply amount is decreased and the second fuel supply amount is increased so that the energy input to the combustor is equivalent to that during single-firing of the first fuel, the increase in the turbine inlet temperature can be suppressed, so that the allowable upper limit supply amount of the second fuel can be increased. Therefore, the amount of steam extracted by the steam extraction line 130 can be further reduced, and the consumer steam supply amount can be further increased.

In particular, when ammonia is co-fired with the first fuel as the second fuel, since ammonia is a hydrogen compound (high hydrogen compound) with low calorific value, namely about 40% of the first fuel, the increase in combustion temperature can be suppressed even if the second fuel flow rate is increased. Thus, the allowable upper limit supply amount of the second fuel can be increased, making it possible to further maintain or increase the output power. On the other hand, given the current high price of ammonia for fuel, it is predicted that spot operation, where ammonia for fuel is stored in an ammonia tank and on-site power generation is possible, is selected for output maintenance operation and steam increase on the steam consumer side of the thermoelectric variable gas turbine cogeneration system. In the future, with the spread of hydrogen carriers and decarbonized fuels, the price of ammonia for fuel is expected to fall, and users indicate their intention to switch fuels.

Since steam is supplied to the gas turbine 9 through the steam extraction line 130, the amount of water contained in the exhaust gas 13 from the gas turbine 9 increases. In this regard, according to the embodiment in which the cogeneration system 100 includes the water recovery system 40 and the feedwater tank 17, water recovered by the water recovery system 40 can be recycled as boiler feedwater supplied to the heat recovery steam generator 14, so the cogeneration system 100 also functions as a water plant. The recovered water in the water recovery system 40 is water in the exhaust gas 13 (combustion produced water, steam injected water). The steam injected water has the effect of being recovered and reused, and the combustion produced water has the effect of creating water.

<Additional Functional Configuration of Controller 90>

The second fuel control part 92 shown in FIG. 5 may be configured to decrease the first fuel supply amount and increase the second fuel supply amount while satisfying a condition that the pressure ratio of the compressor 1 is below the allowable upper limit pressure ratio to prevent the compressor 1 from surging. More specifically, the first fuel control part 91 may decrease the opening degree of the first fuel flow control valve 153, and the second fuel control part 92 may increase the opening degree of the second fuel flow control valve 154 so that the pressure ratio of the compressor 1 is not more than the allowable upper limit pressure ratio. With this configuration, the output power of the gas turbine 9 can be maintained while preventing the compressor 1 from surging. In addition, to the extent that the amount of steam extracted by steam extraction line 130 can be reduced compared to the conventional method, the pressure at the outlet side of compressor 1 can be reduced compared to the conventional method, so that the surging of the compressor 1 can be avoided more reliably.

Although not essential components of the present disclosure, the controller 90 may further include a pressure ratio determination part 97, and the second fuel control part 92 may include a second fuel decrease control part 99. The pressure ratio determination part 97 is configured to determine whether the pressure ratio calculated based on measurement results of the air pressure measuring tool 61 for measuring the pressure ratio of the compressor 1 is not more than the allowable upper limit pressure ratio. The pressure ratio determination part 97 in this example calculates the pressure ratio based on the measurement results of the compressor inlet air pressure measuring tool 62 and the compressor outlet air pressure measuring tool 63. The second fuel decrease control part 99 is configured to perform control to decrease the second fuel supply amount if the pressure ratio is determined to exceed the allowable upper limit pressure ratio. More specifically, the second fuel decrease control part 99 is configured to perform control to decrease the opening degree of the second fuel flow control valve 154.

With this configuration, since the pressure ratio determination part 97 compares the allowable upper limit pressure ratio with the actual pressure ratio, the surging of the compressor 1 can be avoided more reliably. The air pressure measuring tool 61 may not include the compressor inlet air pressure measuring tool 62. In this case, the pressure ratio determination part 97 may acquire the inlet air pressure of the compressor 1, for example, by obtaining weather data disclosed on a particular website. Even in this case, the pressure ratio determination part 97 can make a determination based on the actual pressure ratio.

The fuel supply amount acquisition part 93 may acquire the second fuel supply amount, based on the target output of the gas turbine 9 and the output of the gas turbine 9 measured after it is determined that the consumer steam supply amount measured by the steam flow meter 66 has reached the consumer steam supply amount indicated by the consumer steam increase command. The second fuel control part 92 may then control the second fuel flow control valve 154 so that the second fuel is supplied in the second fuel supply amount acquired by the fuel supply amount acquisition part 93.

With this configuration, after steam based on the consumer steam increase command is supplied to the steam consumer 10, the second fuel supply amount is increased based on the actual output of the gas turbine 9. As a result, the output of the gas turbine 9 can be maintained reliably even when the amount of steam supplied to the steam consumer 10 is increased.

<Method of Operating Cogeneration System 100>

Figure 6:
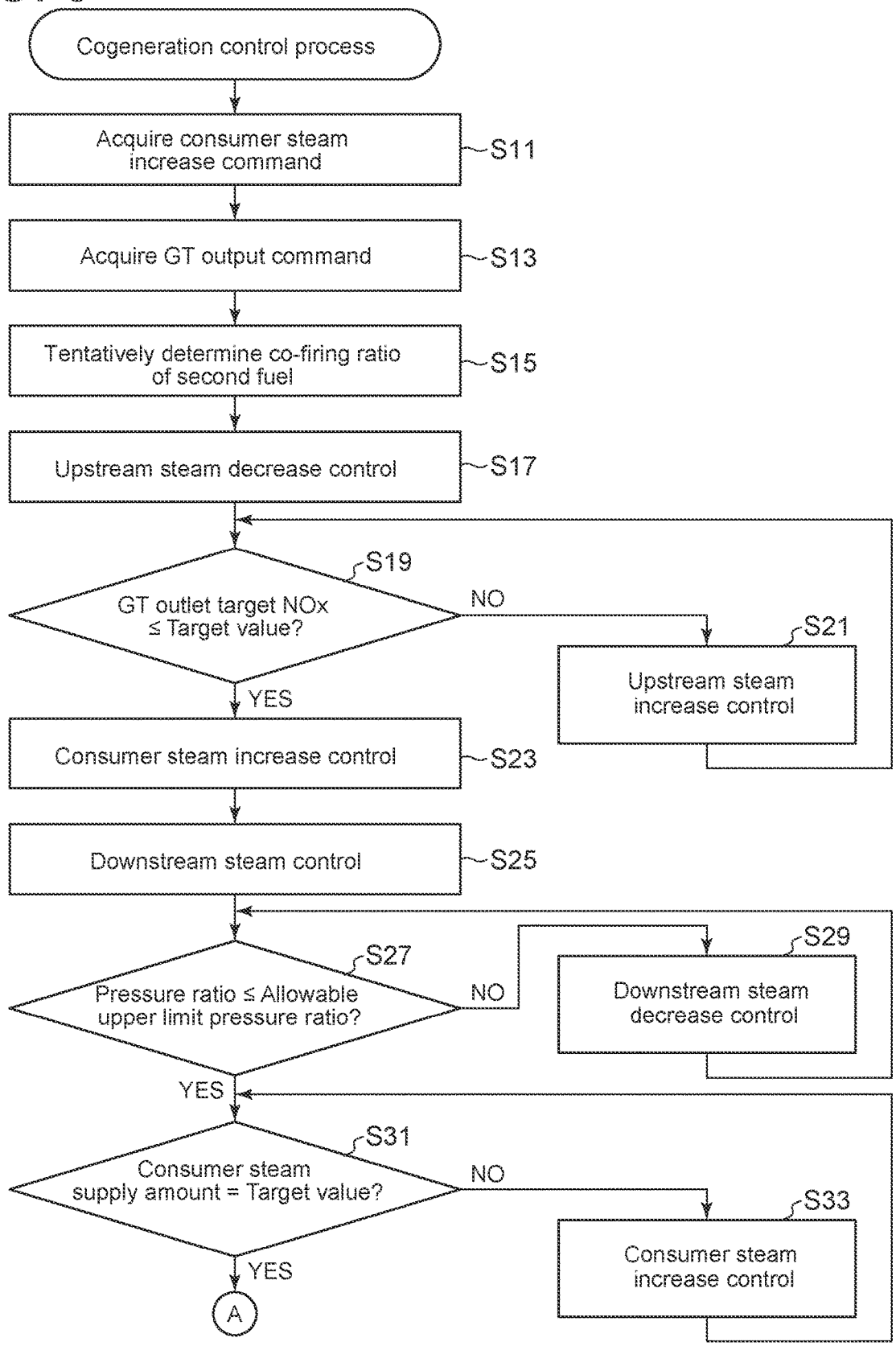
FIG. 6 is a flowchart of the cogeneration system control process according to an embodiment.
Figure 7:
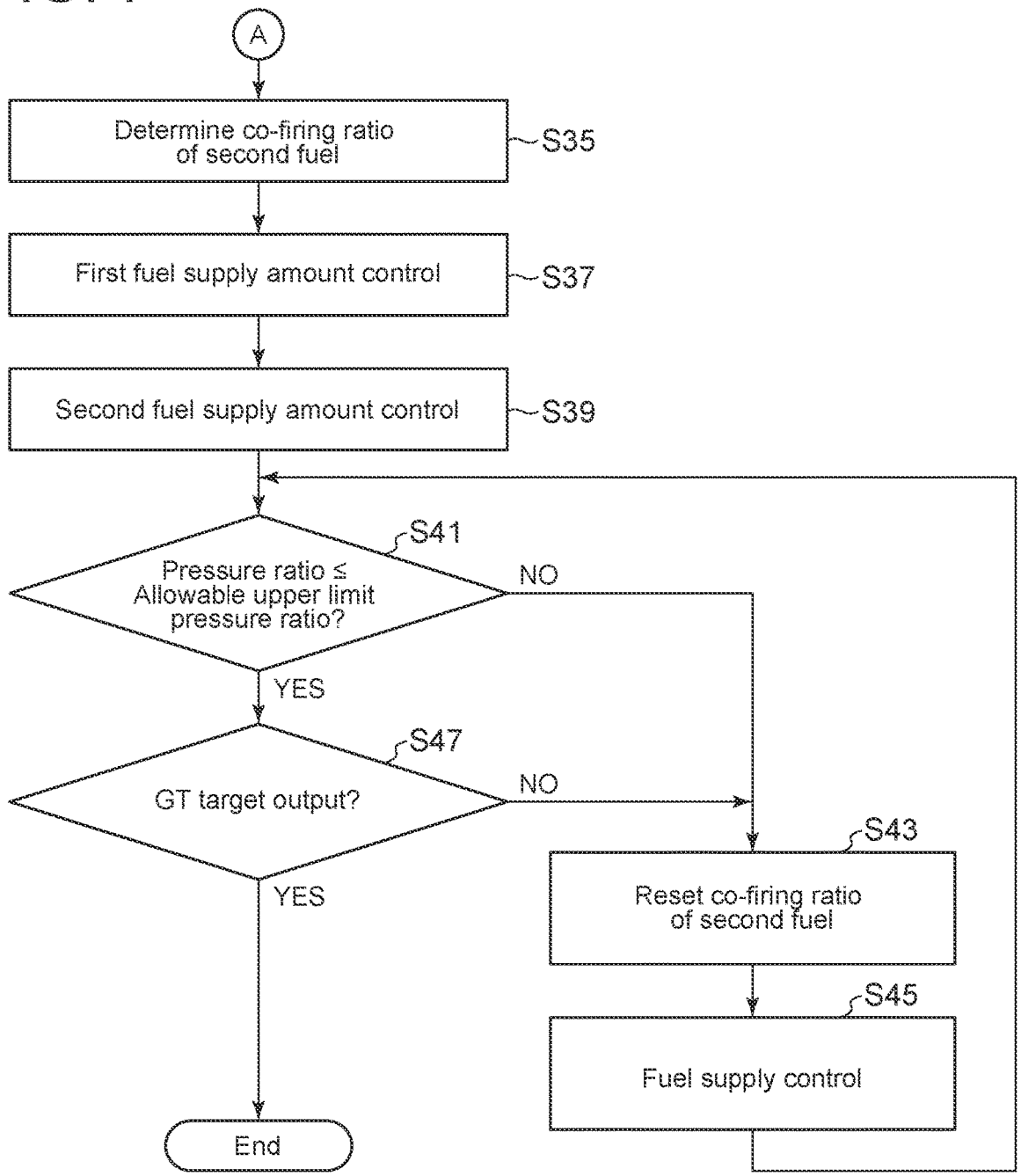
FIG. 7 is a flowchart of the cogeneration system control process following FIG. 6.

FIGS. 6 and 7 are flowcharts of the cogeneration system control process according to an embodiment of the present disclosure and shows an example of the method of operating the cogeneration system 100. The cogeneration system control process is a control process for increasing the consumer steam supply amount and increasing the second fuel co-firing ratio by decreasing the first fuel supply amount while increasing the second fuel supply amount. This control process is executed by the processor of the controller 90. In the following description, "processor of controller 90" may be abbreviated as "processor," and "step" may be abbreviated as "S." Note that co-firing of the first fuel and the second fuel has already occurred in the combustor 3 before the cogeneration system control process is started.

First, the processor acquires a consumer steam increase command (S11) and a gas turbine output command (S13). The processor executing S11 is an example of the consumer command acquisition part 94. The gas turbine output command acquired in S13 indicates the target amount of power generation to maintain the gas turbine output even after the consumer steam supply amount is increased in response to the consumer steam increase command.

The processor tentatively determines the second fuel co-firing ratio, based on the consumer steam supply amount acquired in S11 and the gas turbine output command acquired in S13 (S15). For example, the extraction amount of the steam extraction line 130 (more precisely, the upstream steam supply amount), which is defined by the consumer steam supply amount, and the target amount of power generation indicated by the gas turbine output command are input to a predetermined software module, and the processor acquires the second fuel co-firing ratio output from the software module. The software module is a computing device that stores a function equation, data table, or training model that has been machine learned, and the computing device may be incorporated into the controller 90. The controller 90 uses the function equation, data table, or learning model stored in the computing device to obtain a provisional second fuel co-firing ratio.

The processor performs control to decrease the upstream steam supply amount, based on the second fuel co-firing ratio tentatively determined in S15 (S17). More specifically, the processor calculates the amount of NOx estimated to be generated at the tentatively determined second fuel co-firing ratio, and further calculates the upstream steam amount to set the NOx amount at the turbine outlet to the target value. Such calculations can be accomplished by the processor using a predetermined software module. Then, the processor performs control to decrease the opening degree of the upstream steam flow control valve 131B so that the calculated upstream steam supply amount is achieved. To take a more detailed specific example, the second fuel co-firing ratio tentatively determined in S15 is higher than the current second fuel co-firing ratio, and the first fuel supply amount needs to be reduced. Since the amount of NOx generated in the combustor 3 will be reduced, the processor sends a control signal to the upstream steam flow control valve 131B to decrease the valve opening degree so that the upstream steam supply amount is decreased. The processor executing S17 is an example of the upstream steam control part 81.

The processor determines whether the actual amount of NOx emissions at the gas turbine outlet is not more than the target value, based on measurement results of the turbine outlet NOx measuring tool 69 (S19). If it is determined that the actual amount of NOx emissions determined by the measurement exceeds the target value (S19: NO), the processor performs control to increase the opening degree of the upstream steam flow control valve 131B (S21). The upstream steam supply amount is increased, and the processor returns the process to S19.

If it is determined that the actual amount of NOx emissions is not more than the target value (S19: YES), the processor performs control to increase the opening degree of the steam flow control valve 21B so that the consumer steam supply amount is increased based on the consumer steam increase command acquired in S11 (S23). The processor executing S23 is an example of the steam supply line control part 95.

The processor controls the opening degree of the downstream steam flow control valve 132B, based on the consumer steam increase command acquired in S11 (S25). More specifically, the processor performs control to decrease the opening degree of the downstream steam flow control valve 132B so that the downstream steam supply amount is decreased in accordance with the increase in the consumer steam supply amount indicated by the consumer steam increase command. The processor executing S25 is an example of the downstream steam control part 82.

The processor determines whether the pressure ratio of the compressor 1 is not more than the allowable upper limit pressure ratio, based on measurement results of the air pressure measuring tool 61 (S27). If it is determined that the pressure ratio exceeds the allowable upper limit pressure ratio (S27: NO), the processor performs control to decrease the opening degree of the downstream steam flow control valve 132B (S29). The downstream steam supply amount decreases, and the output of the gas turbine 9 decreases. The processor returns the process to S27.

If it is determined that the pressure ratio is not more than the allowable upper limit pressure ratio (S27: YES), the processor determines whether the current consumer steam supply amount has reached the target consumer steam supply amount indicated by the consumer steam increase command acquired in S11, based on measurement results of the steam flow meter 66 (S31). If it is determined that the current consumer steam supply amount has not reached the target consumer steam supply amount (S31: NO), the processor performs control to increase the opening degree of the steam flow control valve 21B (S33). The consumer steam supply amount is increased, and the processor returns the process to S31. When S33 is performed, control to decrease the opening degree of the downstream steam flow control valve 132B may be performed simultaneously.

If it is determined that the current consumer steam supply amount has reached the target consumer steam supply amount (S31: YES), it is determined that the amount of steam indicated by the consumer steam supply amount has been supplied to the steam consumer 10. In this case, the processor decides the second fuel co-firing ratio, based on the current gas turbine output and the target output of the gas turbine 9 (S35). More specifically, the processor decides the second fuel co-firing ratio such that a deviation between the current amount of power generation measured by the generator output measuring tool 65 and the target power generation amount indicated by the gas turbine output command acquired in S13 is less than a specified value. The processor executing S35 is an example of the fuel supply amount acquisition part 93.

The processor controls the first fuel supply amount (S37) and the second fuel supply amount (S39) so that the second fuel co-firing ratio decided in S35 is achieved. In S37, control is performed to decrease the opening degree of the first fuel flow control valve 153, and in S39, control is performed to increase the opening degree of the second fuel flow control valve 154. The processor executing S37 is an example of the first fuel control part 91, and the processor executing S39 is an example of the second fuel control part 92.

The processor determines whether the pressure ratio of the compressor 1 is not more than the allowable upper limit pressure ratio, based on measurement results of the air pressure measuring tool 61 (S41). The process of S41 is the same as the process of S27. If it is determined that the pressure ratio exceeds the allowable upper limit pressure ratio (S41: NO), the processor resets the second fuel co-firing ratio (S43) and controls the first fuel supply amount and the second fuel supply amount (S45), and the process returns to S41. In S43, a process is performed to update the target power generation amount to a lower value. In S45, a process is performed to decrease the opening degrees of the first fuel flow control valve 153 and the second fuel flow control valve 154 so that both the first fuel supply amount and the second fuel supply amount are decreased.

If it is determined that the pressure ratio is not more than the allowable upper limit pressure ratio (S41: YES), the processor determines whether the power generation amount, which is the output of the gas turbine 9, matches the target power generation amount, based on measurement results of the generator output measuring tool 65 (S47). If it is determined that the amount of power generation measured by the generator output measuring tool 65 does not match the target power generation amount (S47: NO), the processor returns the process to S43 described above. For example, if the measured power generation amount is lower than the target power generation amount, a process of updating the target power generation amount to a lower value is performed in S45. If it is determined that the measured power generation amount matches the target power generation amount (S47: YES), the processor ends the cogeneration system control process.

<Method of Modifying Cogeneration System 100>

Figure 8:
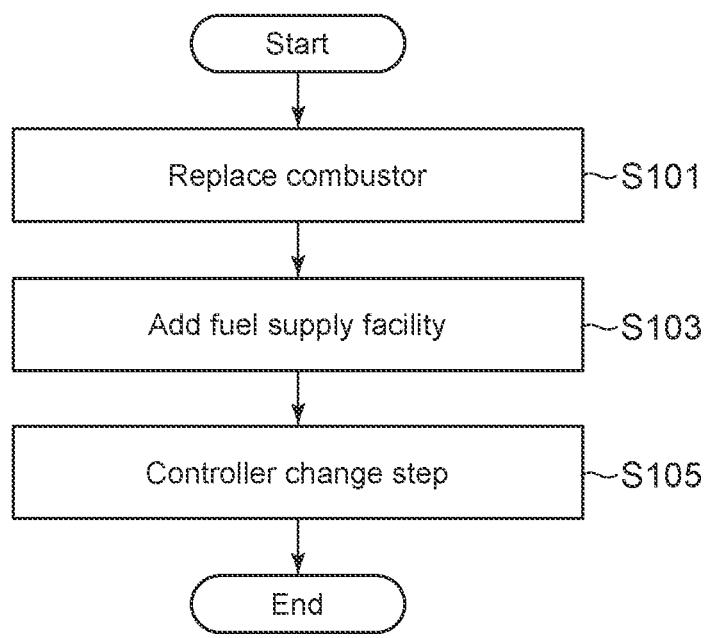
FIG. 8 is a flowchart of a method of modifying a cogeneration system according to an embodiment.
Figure 9:
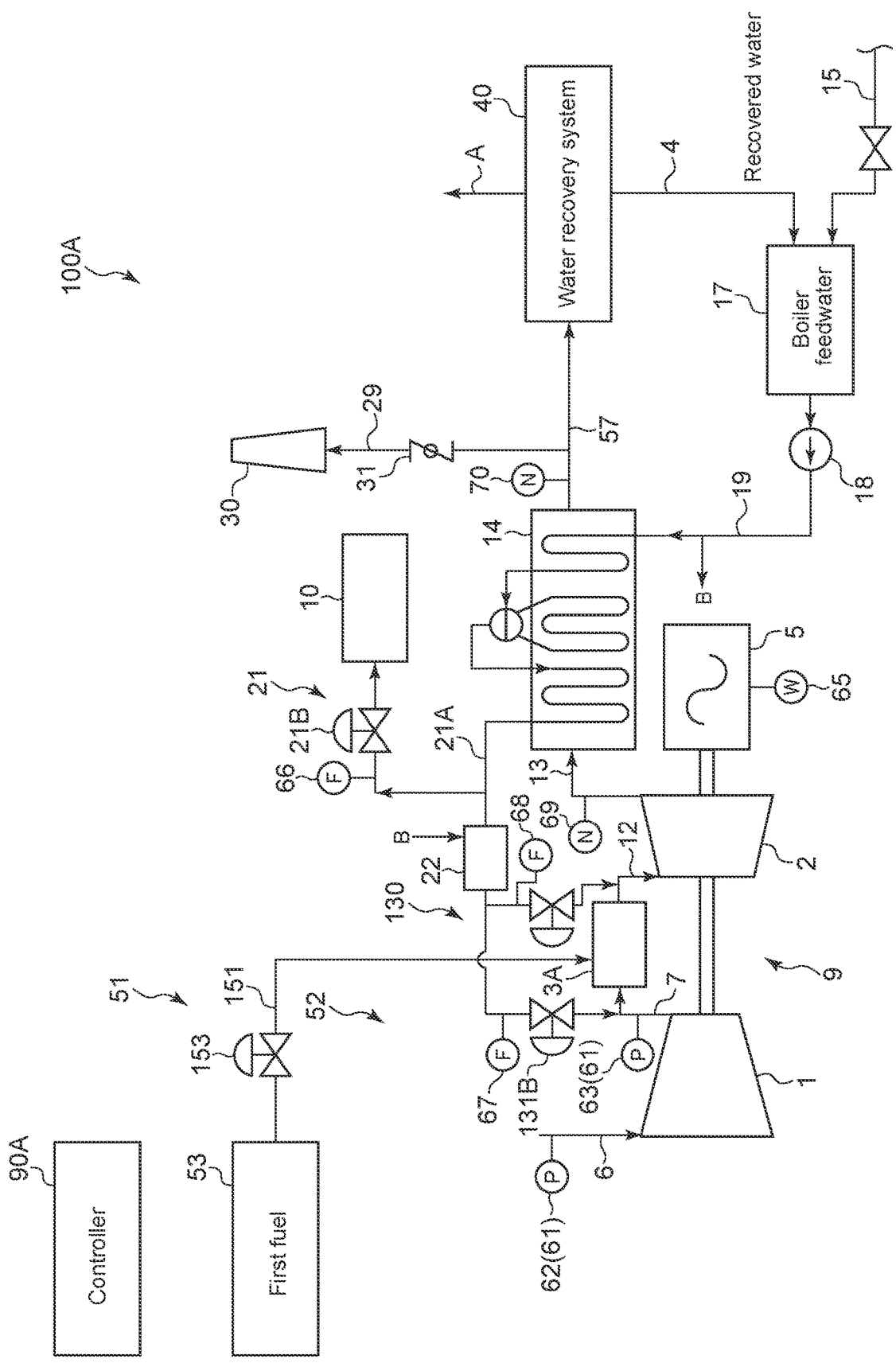
FIG. 9 is a schematic diagram of a cogeneration system before modification according to an embodiment.

The method of modifying a cogeneration system 100 will be described with reference to FIGS. 1, 8, and 9. FIG. 8 is a flowchart of the method of modifying a cogeneration system 100 according to an embodiment of the present disclosure. FIG. 9 is a schematic diagram of a cogeneration system 100A before modification to the cogeneration system 100 according to an embodiment of the present disclosure. The cogeneration system 100A shown in FIG. 9 differs from the cogeneration system 100 in that it does not include the second fuel supply facility 52 shown in FIG. 1, includes a combustor 3A instead of the combustor 3, and includes a controller 90A instead of the controller 90. The combustor 3A is configured to burn only the first fuel. The controller 90A is configured to control the first fuel supply facility 51 so that only the first fuel is supplied to the combustor 3A as fuel.

The cogeneration system 100 is completed by performing the following steps on the cogeneration system 100A to be modified. First, a combustor replacement step of replacing the combustor 3A with the combustor 3 is performed (S101). Then, a combustion supply facility addition step of adding the second fuel supply facility 52 is performed (S103). Then, a controller change step (S105) of changing the controller 90A to the controller 90 is performed. In S105, the software of the controller 90A may be changed, or the controller 90A may be physically replaced with the controller 90. By performing S101 to S105, the cogeneration system 100A can be modified to the cogeneration system 100. S101 and S103 may be performed by a person or by a work robot operated by a person. S105 may be performed by a person modifying the software. Alternatively, S105 may be performed by manually replacing the controllers 90A and 90.

CONCLUSION

The contents described in some embodiments described above would be understood as follows, for instance.

1) A gas turbine cogeneration system (100) according to at least one embodiment of the present disclosure includes: a gas turbine (9) including a compressor (1), a combustor (3), and a turbine (2): a first fuel supply facility (51) for supplying a first fuel to the combustor (3); a second fuel supply facility (52) for supplying a second fuel with a calorific value per mass lower than the first fuel: a heat recovery steam generator (14) for generating steam using exhaust gas (13) discharged from the turbine (2): a steam supply line (21) for supplying the steam discharged from the heat recovery steam generator (14) to a steam consumer (10): a steam extraction line (130) for supplying the steam extracted from the steam supply line (21) to both a head end (24) side of the combustor (3) and a turbine (2) side of the combustor (3) that is closer to the turbine (2) than the head end (24); and a fuel control part (fuel control part 91, second fuel control part 92) for controlling the first fuel supply facility (51) and the second fuel supply facility (52) so that the supply amount of the first fuel decreases and the supply amount of the second fuel increases with a decrease in extraction amount of the steam by the steam extraction line (130).

To increase the amount of steam supplied to the steam consumer (10), it is necessary to decrease the amount of steam extracted by the steam extraction line (130). With the above configuration 1), in this case, the first fuel control part (91) decreases the supply amount of the first fuel, and the second fuel control part (92) increases the supply amount of the second fuel to maintain the output of the gas turbine (9). The second fuel must be supplied so that the turbine inlet temperature does not exceed a predetermined temperature, i.e., the heat resistance temperature originally set for downstream parts such as turbine blades, but the allowable upper limit supply amount of the second fuel is higher than that of the first fuel because of the lower calorific value per unit mass of the second fuel. In other words, since the supply of the second fuel is sufficient to maintain the output of the gas turbine (9), the amount of steam supplied to the steam consumer (10) can be increased more than before. Thus, it is possible to achieve the cogeneration system (100) that can maintain the output of the gas turbine (9) even when the amount of steam supplied to the steam consumer (10) is increased by reducing steam injected into the combustor for increasing the turbine output.

2) In some embodiments, in the gas turbine cogeneration system (100) as defined in the above 1), the fuel control part (first fuel control part 91 and second fuel control part 92) is configured to decrease the supply amount of the first fuel and increase the supply amount of the second fuel while satisfying a condition that the pressure ratio of the compressor (1) is less than the allowable upper limit pressure ratio.

With the above configuration 2), the output power of the gas turbine (9) can be maintained while preventing the compressor (1) from surging. In addition, to the extent that the amount of steam extracted by steam extraction line (130) can be reduced compared to the conventional method, the pressure at the outlet side of compressor (1) can be reduced compared to the conventional method, so that the surging of the compressor (1) can be avoided more reliably.

3) In some embodiments, the gas turbine cogeneration system (100) as defined in the above 2) further includes a pressure ratio determination part (97) for determining whether the pressure ratio calculated based on a measurement result of an air pressure measuring tool (61) for measuring the pressure ratio of the compressor (1) is not more than the allowable upper limit pressure ratio. The fuel control part (second fuel control part 92) includes a second fuel decrease control part (99) for decreasing the supply amount of the second fuel if the pressure ratio is determined to be more than the allowable upper limit pressure ratio.

With the above configuration 3), since the pressure ratio determination part (97) compares the allowable upper limit pressure ratio with the actual pressure ratio, the surging of the compressor (1) can be avoided more reliably.

4) In some embodiments, the gas turbine cogeneration system (100) as defined in any of the above 1) to 3) further includes a fuel supply amount acquisition part (93) for acquiring the supply amount of the second fuel, based on a target output of the gas turbine (9) and an output of the gas turbine (9) measured after it is determined that the steam is supplied in an amount indicated by a consumer steam increase command to increase the supply amount of the steam to the steam consumer (10). The fuel control part (second fuel control part 92) is configured to control the second fuel supply facility (52) so that the second fuel is supplied in the supply amount acquired by the fuel supply amount acquisition part (93).

With the above configuration 4), after steam based on the consumer steam increase command is supplied to the steam consumer (10), the supply amount of the second fuel is increased based on the actual output of the gas turbine (9). As a result, the output of the gas turbine (9) can be maintained reliably even when the amount of steam supplied to the steam consumer (10) is increased.

5) In some embodiments, the gas turbine cogeneration system (100) as defined in any of the above 1) to 4) further includes: a water recovery system (40) for recovering water from the exhaust gas by heat exchange between the exhaust gas from the heat recovery steam generator (14) and refrigerant water; and a feedwater tank (17) for storing boiler feedwater for supplying recovered water recovered by the water recovery system (40) to the heat recovery steam generator (14).

Since steam is supplied to the gas turbine (9) through the steam extraction line (130), the amount of water contained in the exhaust gas from the gas turbine (9) increases. In this regard, with the above configuration 5), water recovered by the water recovery system (40) can be recycled as boiler feedwater supplied to the heat recovery steam generator (14), so the gas turbine cogeneration system (100) also functions as a water plant.

6) In some embodiments, in the gas turbine cogeneration system (100) as defined in any of the above 1) to 5), the first fuel is any of natural gas, off gas, or hydrogen gas fuel mainly composed of hydrogen gas.

According to the above configuration 6), the amount of carbon emissions can be reduced compared to the case where the first fuel is oil fuel such as heavy oil.

7) In some embodiments, in the gas turbine cogeneration system (100) as defined in any of the above 1) to 6), the second fuel is fuel mainly composed of ammonia or methanol.

With the above configuration 7), the increase in outlet temperature of the combustor (3) can be suppressed by the latent heat of evaporation of water produced by combustion of the second fuel. Even if the second fuel supply amount is increased, the increase in the turbine inlet temperature can be suppressed, so that the allowable upper limit supply amount of the second fuel can be increased. Therefore, the amount of steam extracted by the steam extraction line (130) can be further reduced, and the amount of steam supplied to the steam consumer (10) can be further increased.

8) At least one embodiment of the present disclosure provides a method of operating a gas turbine cogeneration system (100) including: a gas turbine (9) including a compressor (1), a combustor (3), and a turbine (2): a first fuel supply facility for supplying a first fuel to the combustor (3): a second fuel supply facility (52) for supplying a second fuel with a calorific value per mass lower than the first fuel: a heat recovery steam generator (14) for generating steam using exhaust gas discharged from the turbine (2): a steam supply line (21) for supplying the steam discharged from the heat recovery steam generator (14) to a steam consumer (10); and a steam extraction line (130) for supplying the steam extracted from the steam supply line (21) to both a head end (24) side of the combustor (3) and a turbine (2) side of the combustor (3) that is closer to the turbine (2) than the head end (24). The method includes a fuel control step (S37, S39) of controlling the first fuel supply facility (51) and the second fuel supply facility (52) so that the supply amount of the first fuel decreases and the supply amount of the second fuel increases with a decrease in extraction amount of the steam by the steam extraction line (130).

With the above configuration 8), for the same reason as the above 1), the method of operating a gas turbine cogeneration system (100) is realized whereby it is possible to maintain the output of the gas turbine (9) even when the amount of steam supplied to a steam consumer is increased.

9) At least one embodiment of the present disclosure provides a method of modifying a gas turbine cogeneration system (100A) including: a gas turbine (9) including a compressor (1), a combustor (3A), and a turbine (2); a first fuel supply facility (51) for supplying a first fuel to the combustor (3A): a heat recovery steam generator (14) for generating steam using exhaust gas discharged from the turbine (2); a steam supply line (21) for supplying the steam discharged from the heat recovery steam generator (14) to a steam consumer (10); and a steam extraction line (130) for supplying the steam extracted from the steam supply line (21) to both a head end (24) side of the combustor (3A) and a turbine (2) side of the combustor (3A) that is closer to the turbine (2) than the head end (24). The method includes: a combustor replacement step (S101) of replacing the combustor (3A) configured to burn only the first fuel with a combustor (3) configured to burn both the first fuel and a second fuel with a calorific value per mass lower than the first fuel; a fuel supply facility addition step (S103) of adding a second fuel supply facility (52) for supplying the second fuel; and a controller change step (S105) of changing a controller (90A) for controlling the first fuel supply facility so that only the first fuel is supplied as fuel to a controller (90) for controlling the first fuel supply facility (51) and the second fuel supply facility (52) so that the supply amount of the first fuel decreases and the supply amount of the second fuel increases with a decrease in extraction amount of the steam by the steam extraction line (130).

With the above configuration 9), for the same reason as the above 1), the method of modifying a gas turbine cogeneration system (100A) is realized whereby it is possible to maintain the output of the gas turbine (9) even when the amount of steam supplied to a steam consumer is increased.

The invention claimed is:

1. A method of operating a gas turbine cogeneration system, the gas turbine cogeneration system comprising:
   a gas turbine including a compressor, a combustor, and a turbine;
   a first fuel supply facility for supplying a first fuel to the combustor;
   a second fuel supply facility for supplying a second fuel to the combustor, the second fuel having a calorific value per mass that is lower than that of the first fuel;
   a heat recovery steam generator for generating steam using exhaust gas discharged from the turbine;
   a steam supply line for supplying the steam discharged from the heat recovery steam generator to a steam consumer; and
   a steam extraction line for supplying steam extracted from the steam supply line to both a head end side of the combustor and a turbine side of the combustor, the turbine side of the combustor being closer to the turbine than the head end, the method comprising;
- acquiring a consumer steam increase command to increase a consumer steam supply amount, the consumer steam supply amount being a supply amount of the steam supplied to the steam consumer;
- controlling the steam supply line to achieve the consumer steam supply amount indicated by the consumer steam increase command;
- controlling the steam extraction line to reduce an extraction amount of the steam extracted by the steam extraction line in response to the increased consumer steam supply amount;
- controlling the first fuel supply facility so that a supply amount of the first fuel decreases in response to the decrease in the extraction amount of the steam by the steam extraction line; and
- controlling the second fuel supply facility so that a supply amount of the second fuel increases in response to the decrease in the extraction amount of the steam by the steam extraction line.

2. A method of modifying a gas turbine cogeneration system, the gas turbine cogeneration system comprising:
- a gas turbine including a compressor, a combustor configured to burn only a first fuel, and a turbine;
- a first fuel supply facility for supplying the first fuel to the combustor;
- a heat recovery steam generator for generating steam using exhaust gas discharged from the turbine;
- a steam supply line for supplying the steam discharged from the heat recovery steam generator to a steam consumer; and
- a steam extraction line for supplying the steam extracted from the steam supply line to both a head end side of the combustor and a turbine side of the combustor, the turbine side of the combustor being closer to the turbine than the head end, the method comprising:
- replacing the combustor configured to burn only the first fuel with a second combustor configured to burn both the first fuel and a second fuel with a calorific value per mass lower than the first fuel;
- adding a second fuel supply facility for supplying the second fuel to the second combustor; and
- changing a controller configured to control only the first fuel supply facility to a second controller configured to control each of the first fuel supply facility and the second fuel supply facility, the second controller comprising a processor communicatively coupled with a memory, the memory having instructions programmed therein which, when executed by the processor, cause the second controller to:
  - acquire a consumer steam increase command to increase a consumer steam supply amount, the consumer steam supply amount being a supply amount of the steam supplied to the steam consumer;
  - control the steam supply line to achieve the consumer steam supply amount indicated by the consumer steam increase command;
  - control the steam extraction line so as to reduce an extraction amount of the steam extracted by the steam extraction line in response to the increased consumer steam supply amount;
  - control the first fuel supply facility so that a supply amount of the first fuel decreases in response to a decrease in the extraction amount of the steam by the steam extraction line; and
  - control the second fuel supply facility so that a supply amount of the second fuel increases in response to the decrease in the extraction amount of the steam by the steam extraction line.

3. A gas turbine cogeneration system, comprising:
- a gas turbine including a compressor, a combustor, and a turbine;
- a first fuel supply facility for supplying a first fuel to the combustor;
- a second fuel supply facility for supplying a second fuel to the combustor, the second fuel having a calorific value per mass that is lower than that of the first fuel;
- a heat recovery steam generator for generating steam using exhaust gas discharged from the turbine;
- a steam supply line for supplying the steam discharged from the heat recovery steam generator to a steam consumer;
- a steam extraction line for supplying steam extracted from the steam supply line to both a head end side of the combustor and a turbine side of the combustor, the turbine side of the combustor being closer to the turbine than the head end; and
- a controller comprising a processor communicatively coupled with a memory, the memory having instructions programmed therein which, when executed by the processor, cause the controller to:
  - acquire a consumer steam increase command to increase a consumer steam supply amount, the consumer steam supply amount being a supply amount of the steam supplied to the steam consumer;
  - control the steam supply line to achieve the consumer steam supply amount indicated by the consumer steam increase command;
  - control the steam extraction line to reduce an extraction amount of the steam extracted by the steam extraction line in response to the increased consumer steam supply amount;
  - control the first fuel supply facility so that a supply amount of the first fuel decreases in response to a decrease in the extraction amount of the steam by the steam extraction line; and
  - control the second fuel supply facility so that a supply amount of the second fuel increases in response to the decrease in the extraction amount of the steam by the steam extraction line.

4. The gas turbine cogeneration system according to claim 3, wherein the controller is further configured to increase the supply amount of the second fuel while satisfying a condition that a pressure ratio of the compressor is less than an allowable upper limit pressure ratio.

5. The gas turbine cogeneration system according to claim 4, wherein the controller is further configured to: determine whether the pressure ratio calculated based on a measurement result of an air pressure measuring tool for measuring the pressure ratio of the compressor is not more than the allowable upper limit pressure ratio; and
decrease the supply amount of the second fuel when the pressure ratio is determined to be more than the allowable upper limit pressure ratio.

6. The gas turbine cogeneration system according to claim 3, wherein the controller is further configured to:
- acquire the supply amount of the first fuel and the supply amount of the second fuel, based on a target output of the gas turbine and an output of the gas turbine measured after it is determined that the steam is supplied in accordance with the consumer steam increase command.

7. The gas turbine cogeneration system according to claim 3, further comprising:
 a water recovery system including a heat exchanging vessel for recovering water from the exhaust gas by heat exchange between the exhaust gas from the heat recovery steam generator and refrigerant water; and
 a feedwater tank for storing boiler feedwater for supplying recovered water recovered by the water recovery system to the heat recovery steam generator.

8. The gas turbine cogeneration system according to claim 3,
 wherein the first fuel is any of natural gas, off gas, or hydrogen gas fuel including hydrogen gas.

9. The gas turbine cogeneration system according to claim 3,
 wherein the second fuel is fuel which includes ammonia or methanol.

\* \* \* \* \*